(No Model.)
A. HARVEY.
Coupling for Steam Supply Pipes.
No. 233,412. Patented Oct. 19, 1880.
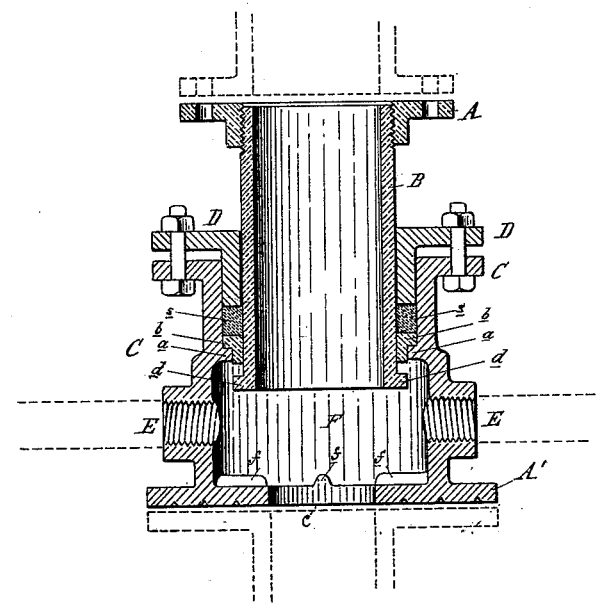
Attest:
A. Barthel
Charles J. Hunt
Inventor:
A. Harvey
By Atty
Thos. S. Sprague

UNITED STATES PATENT OFFICE.

ANDREW HARVEY, OF DETROIT, MICHIGAN.

COUPLING FOR STEAM-SUPPLY PIPES.

SPECIFICATION forming part of Letters Patent No. 233,412, dated October 19, 1880.

Application filed July 12, 1880. (No model.)

*To all whom it may concern:*

Be it known that I, ANDREW HARVEY, of Detroit, Wayne county, Michigan, have invented an Improvement in Couplings for Steam-Supply Pipes, of which the following is a specification.

The nature of this invention relates to certain new and useful improvements in supply-couplings for steam-pipes; and the invention consists in the peculiar construction, arrangement, and combinations of the parts, all as more fully hereinafter set forth.

In steam-pipes, especially in pipes of large size, the expansion and contraction are always a source of danger to supply-couplings, which danger can only be completely counteracted by enabling such couplings to compensate themselves, and to effect such compensation in a manner and by such means that it never will become detrimental to the duty of the coupling.

In the accompanying drawing, which shows a central section of my improved coupling, and forms a part of this specification, A A' are the flanges which connect my supply-coupling with the pipe-line. B C are the two parts composing my supply-coupling. D is a stuffing-box. E E are supply-pipe connections.

The part C of the supply-coupling has on its inside and cast with its body an annular flange, $a$, upon which is accurately fitted the annular metal bushing $b$, which is firmly held in place by the stuffing-box D.

The compensating coupling or thimble B, which, by the force of the expansion or contraction of the pipe-line, will be driven in or drawn out of the coupling C, has an annular flange, $d$, upon its inner end, which will impinge against the bushing $b$ and prevent the thimble B from being forced out when contracted, the flange $d$ in such case pressing against the lower face of the bushing; and in case of much contraction the movable bushing $b$ will yield and press the elastic packing $s$ upward, thus preventing breakage of the parts from contraction. By this construction, also, the thimble B may be readily removed and replaced by removing the stuffing-box D, packing $s$, and bushing $b$, when the thimble can readily be removed.

It is hardly necessary to explain here that such accidents cannot always be traced to faulty calculation of the needed contraction, but will occur owing to other circumstances, even where such contraction was in the first instance provided for. Even to prevent accidental disconnection when pipe-lines are laid, and to give the workmen an unerring guide as to the limit of the possible contraction, is an important gain.

To prevent the expansion which sometimes accidentally or otherwise accumulates at certain points of the pipe-line from interfering with the free flow of steam to the supply-pipes, I enlarge that portion, F, of the coupling C to which the supply-pipes are connected, and cast on the inside of the flange A' the stops $ff$, so that at all times, even when the extreme limit of expansion is reached, steam is always free to pass through the enlarged chamber F to the supply-pipes.

What I claim as my invention is—

The combination, with the cylinder C, having the interior flange, $a$, of the movable bushing $b$, packing $s$, stuffing-box D, and tube B, provided with the flange $d$, substantially as described, and for the purpose set forth.

ANDREW HARVEY.

Witnesses:
H. S. SPRAGUE,
CHARLES J. HUNT.